(12) United States Patent
Gardner et al.

(10) Patent No.: US 11,873,582 B2
(45) Date of Patent: Jan. 16, 2024

(54) FILAMENTS FOR 3D PRINTING

(71) Applicant: University of Maine System Board of Trustees, Orono, ME (US)

(72) Inventors: Douglas J. Gardner, Brewer, ME (US); Lu Wang, Old Town, ME (US); Jordan Elliott Sanders, Pocatello, ID (US)

(73) Assignee: University of Maine System Board of Trustees, Orono, ME (US)

( * ) Notice: Subject to any disclaimer, the term of this patent is extended or adjusted under 35 U.S.C. 154(b) by 291 days.

(21) Appl. No.: 16/762,082

(22) PCT Filed: Nov. 15, 2018

(86) PCT No.: PCT/US2018/061342
§ 371 (c)(1),
(2) Date: May 6, 2020

(87) PCT Pub. No.: WO2019/099713
PCT Pub. Date: May 23, 2019

(65) Prior Publication Data
US 2020/0353672 A1   Nov. 12, 2020

Related U.S. Application Data

(60) Provisional application No. 62/587,233, filed on Nov. 16, 2017.

(51) Int. Cl.
| | |
|---|---|
| *D01F 6/04* | (2006.01) |
| *B33Y 10/00* | (2015.01) |
| *B33Y 30/00* | (2015.01) |
| *B29C 64/118* | (2017.01) |
| *B33Y 70/10* | (2020.01) |
| *C08K 7/02* | (2006.01) |
| *C08L 23/12* | (2006.01) |
| *C08L 23/14* | (2006.01) |
| *C08L 23/10* | (2006.01) |
| *B29K 1/00* | (2006.01) |
| *B29K 101/12* | (2006.01) |
| *B29K 105/12* | (2006.01) |

(52) U.S. Cl.
CPC .............. *D01F 6/04* (2013.01); *B29C 64/118* (2017.08); *B33Y 10/00* (2014.12); *B33Y 30/00* (2014.12); *B33Y 70/10* (2020.01); *C08K 7/02* (2013.01); *C08L 23/10* (2013.01); *C08L 23/12* (2013.01); *C08L 23/14* (2013.01); *B29K 2001/00* (2013.01); *B29K 2101/12* (2013.01); *B29K 2105/124* (2013.01); *C08L 2205/16* (2013.01)

(58) Field of Classification Search
CPC ....... B29C 64/118; B33Y 10/00; B33Y 30/00; B33Y 70/00–10; B33Y 80/00; B29K 2001/00; B29K 2101/12; B29K 2105/24; C08L 23/10–16; C08L 23/04–0892

USPC .......................................................... 264/308
See application file for complete search history.

(56) References Cited

U.S. PATENT DOCUMENTS

| | | | | |
|---|---|---|---|---|
| 7,659,330 | B2 * | 2/2010 | Gardner ................... | C08L 77/00 524/13 |
| 7,897,248 | B2 | 3/2011 | Barrera et al. | |
| 10,280,294 | B2 * | 5/2019 | Gardner ................ | B29C 64/165 |
| 11,034,838 | B2 * | 6/2021 | Mayes ..................... | C08L 51/04 |
| 11,235,513 | B2 | 2/2022 | Nakai et al. | |
| 11,370,894 | B2 * | 6/2022 | Mayes ....................... | C08J 9/34 |
| 2003/0004233 | A1 | 1/2003 | Yamaguchi et al. | |
| 2003/0178220 | A1 | 9/2003 | Barusseau et al. | |
| 2015/0044520 | A1 | 2/2015 | Feuerstack et al. | |
| 2015/0129276 | A1 | 5/2015 | Shumaker et al. | |
| 2016/0152811 | A1 * | 6/2016 | Gardner ................... | C08L 1/04 264/319 |
| 2016/0201265 | A1 | 7/2016 | Kosonen et al. | |
| 2016/0297103 | A1 * | 10/2016 | Lee .......................... | C08L 53/00 |

(Continued)

FOREIGN PATENT DOCUMENTS

| | | |
|---|---|---|
| CN | 106243508 | 12/2016 |
| CN | 106243508 A | 12/2016 |

(Continued)

OTHER PUBLICATIONS

KR 101476057 B1 machine translation (Dec. 2014).*
Bartczak, Z. et al, Spherulite nucleation in blends of isotactic polypropylene with high-density polyethylene, Polymer, 27: 537-543 (1986).
Fornes, T.D. and Paul, D.R., Crystallization behavior of nylon 6 nanocomposites, Polymer, 44: 3945-3961 (2003).

(Continued)

*Primary Examiner* — Ana L. Woodward
(74) *Attorney, Agent, or Firm* — Choate, Hall & Stewart LLP; Brian E. Reese; Samuel R. Polio

(57) ABSTRACT

Presented herein are materials, methods, and systems for the improved 3D printing improved 3D printing of materials that include polypropylene. In some embodiments, the present disclosure provides a composite comprising a polymer matrix and a plurality of fibers for improved 3D printing. For example, the polymer matrix may have a composition that includes a polymer blend of polypropylene (PP) and polyethylene (PE) (e.g., high density polyethylene (HDPE), low density polyethylene (LDPE), linear low-density polyethylene (LLDPE)), impact modified polypropylene copolymer and/or polypropylene random copolymer with a plurality of fibers. In some embodiments, the plurality of fibers comprises cellulosic nanofibers (e.g., natural cellulosic nanofibers, e.g., cellulose nanofibrils). In some embodiments, filaments are prepared from the composites by melt compounding the polymer matrix (e.g., PP copolymers and/or PP/PE pellets) with a plurality of fibers and extruding the mixture.

12 Claims, 5 Drawing Sheets

(56) References Cited

U.S. PATENT DOCUMENTS

| | | |
|---|---|---|
| 2016/0339633 A1 | 11/2016 | Stolyarov et al. |
| 2017/0066193 A1 | 3/2017 | Kim et al. |
| 2018/0038015 A1* | 2/2018 | Sano .................. B33Y 70/00 |
| 2021/0024722 A1 | 1/2021 | Fujihashi et al. |

FOREIGN PATENT DOCUMENTS

| | | |
|---|---|---|
| CN | 107216517 A | 9/2017 |
| CN | 107216519 A | 9/2017 |
| EP | 1234853 A1 | 8/2002 |
| JP | 2002/322376 A | 11/2002 |
| JP | 2003/534955 A | 11/2003 |
| JP | 2008/217927 | 9/2008 |
| JP | 2008/217927 A | 9/2008 |
| JP | 2016/028887 | 3/2016 |
| JP | 2016/28887 A | 3/2016 |
| JP | 2016/533435 A | 10/2016 |
| JP | 2016/203633 | 12/2016 |
| JP | 2016/203633 A | 12/2016 |
| JP | 2017/065111 | 4/2017 |
| JP | 2017/65111 A | 4/2017 |
| JP | 2017/128073 A | 7/2017 |
| JP | 2017/170881 | 9/2017 |
| JP | 2017/170881 A | 9/2017 |
| KR | 101476057 B1 * | 12/2014 |
| WO | WO-2015/009972 A1 | 1/2015 |
| WO | WO-2015/044520 A1 | 4/2015 |
| WO | WO 2016/171191 A1 * | 10/2016 |
| WO | WO-2019/099713 A1 | 5/2019 |

OTHER PUBLICATIONS

Galeski, A. et al., Spherulite nucleation in polypropylene blends with low density polyethylene, Polymer, 25: 1323-1326 (1984).

Hegde, R. R. et al, Different crystallization mechanisms in polypropylene-nanoclay nanocomposite with different weight percentage of nanoclay additives, J. Mater. Res., 27(10): 1360-1371 (2011).

International Search Report for PCT/US18/61342 (Improved Filaments for 3D Printing, filed Nov. 15, 2018), issued by ISA/US, 3 pages (dated Jan. 25, 2019).

Wikipedia, Melt Flow Index, retrieved from <<https://en/wikipedia.org/w/index.php?tutke=Melt_flow_index&oldid=798959385>>, accessed on Jan. 10, 2019.

Written Opinion for PCT/US18/61342 (Improved Filaments for 3D Printing, filed Nov. 15, 2018), issued by ISA/US, 9 pages (dated Jan. 25, 2019).

* cited by examiner

FILAMENTS FOR 3D PRINTING

CROSS REFERENCE TO RELATED APPLICATIONS

The present application claims priority to U.S. provisional patent application No. 62/587,233, filed Nov. 16, 2017, the entire contents of which are hereby incorporated by reference.

BACKGROUND

Additive manufacturing, or 3D printing, is an important manufacturing tool in a number of industries for the fabrication of automotive components, aerospace components, packaging materials, construction components, medical components, and the like. Fused filament fabrication (FFF) is a type of additive manufacturing that is used to print thermoplastic parts. During FFF, a three-dimensional part can be printed from a thermoplastic filament. In this process, the thermoplastic filament is fed through a heated extruder head, which melts the thermoplastic. The melted thermoplastic is then printed on a surface as the extruder head moves (e.g., under computer control) in an appropriate pattern to create a layer of a printed part. This printing proceeds in layer-wise manner such that one layer is printed and allowed to cool (e.g., for the solidification of the printed thermoplastic). After the printed thermoplastic layer cools, subsequent layers are printed until a desired part is obtained.

FFF is a popular 3D printing technique because of its low cost and relatively simple operation. However, not all thermoplastic polymers are compatible with FFF. In particular, polypropylene (PP), a thermoplastic that is commonly used in many applications, is not readily compatible with FFF because PP layers tend to shrink after being printed. This shrinkage of printed PP results in the dimensional instability of printed PP parts such that a subsequent layer cannot be reliably printed after a previously printed layer shrinks and becomes warped.

SUMMARY

Presented herein are materials, methods, and systems for the improved 3D printing of materials that include polypropylene. In some embodiments, the present disclosure provides a composite comprising a polymer matrix and a plurality of fibers for improved 3D printing. For example, the polymer matrix may have a composition that includes a polymer blend of polypropylene (PP) and polyethylene (PE) (e.g., high density polyethylene (HDPE), low density polyethylene (LDPE), linear low-density polyethylene (LLDPE)), impact modified polypropylene copolymer and/or polypropylene random copolymer with a plurality of fibers. In some embodiments, the plurality of fibers comprises cellulosic nanofibers (e.g., natural cellulosic nanofibers, e.g., cellulose nanofibrils). In some embodiments, filaments are prepared from the composites by melt compounding the polymer matrix (e.g., PP copolymers and/or PP/PE pellets) with a plurality of fibers and extruding the mixture. In some embodiments, the formulation of these composites provides improved 3D printing (e.g., FFF, or fused layer modeling, also referred to as "FLM"). For example, the composite may have a slower crystallization rate than PP. For example, a printed layer of the composite may undergo less shrinkage during crystallization than a layer of PP. For example, the composite may have a greater dimensional stability and result in an improved reproduction of printed parts than PP alone. In some embodiments, the plurality of fibers enhances the mechanical properties of the printed products. In some embodiments, a filament of the composite is printed on a plate that is at an elevated temperature to slow the rate of crystallization and improve the quality of a 3D printed product.

In one aspect, the present disclosure is directed to a composite (e.g., composite thermoplastic material, e.g., for additive manufacturing, e.g., fused layer modeling), the composite comprising a polymer matrix.

In some embodiments, the polymer matrix has a composition that comprises one or more members selected from the group consisting of (i) a polymer blend comprising polypropylene (PP) and polyethylene [e.g., high density polyethylene (HDPE), low density polyethylene (LDPE), linear low-density polyethylene (LLDPE)], (ii) a modified (e.g., impact modified) polypropylene copolymer, and/or (iii) a polypropylene random copolymer.

In some embodiments, the melt flow index (MFI) of the polymer matrix is in a range from about 5 to 30 g/10 min.

In some embodiments, the composite further comprises a plurality of fibers (e.g., natural cellulose nanofibers).

In some embodiments, the plurality of fibers comprises a plurality of natural cellulosic nanofibers (e.g., cellulose nanofibrils) (e.g., natural cellulosic nanofibers wherein an average diameter of the nanofibers is less than about 1000 nm).

In some embodiments, a weight percent of the plurality of fibers is in a range from 3% to 30% (based on the total weight of the composite).

In one aspect, the present disclosure is directed to a pellet comprising the composite described herein.

In one aspect, the present disclosure is directed to a filament comprising the composite described herein.

In one aspect, the present disclosure is directed to a method of 3D printing, comprising 3D printing with the filament described herein.

In some embodiments, a temperature of the substrate (e.g., a plate on which 3D printing is performed) is at least 35° C. (e.g., maintained at a relatively high temperature to reduce crystallization and shrinkage of the composite).

In one aspect, the present disclosure is directed to a system for 3D printing according to the method(s) described herein.

In one aspect, the present disclosure is directed to a system for preparing the filament described herein.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
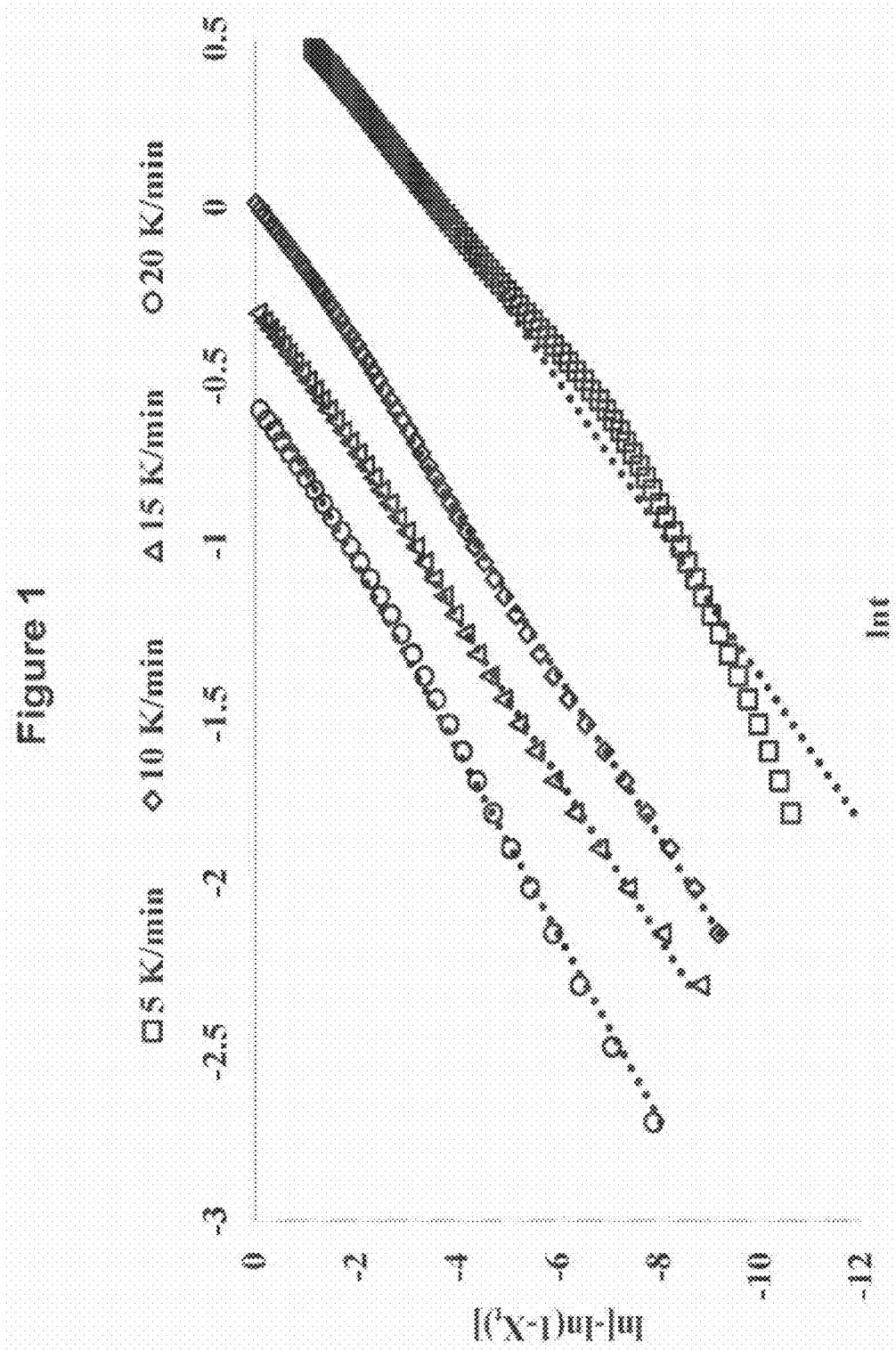
FIG. 1 shows plots of $\ln[-\ln(1-X_t)]$ against $\ln(t)$ for iPP/CNF10% composites according to a Jeziorny model during crystallization at various cooling rates, according to an illustrative example.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

It is contemplated that materials, methods, and processes of the present invention encompass variations and adaptations developed using information from the embodiments described herein. Adaptation and/or modification of the materials, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Headers are provided for the convenience of the reader—the presence and/or placement of a header is not intended to limit the scope of the subject matter described herein.

The present disclosure encompasses a recognition that a polymer matrix (e.g., with a composition that comprises (i) a polymer blend comprising PP and PE (e.g. HDPE, LDPE, and/or LLDPE) (ii) a modified PP copolymer, and/or (iii) a PP random copolymer) may have a lower crystallization rate than PP, resulting in improved 3D printing. The present disclosure further encompasses a recognition that a composite comprising the polymer matrix and a plurality of fibers at an appropriate concentration (e.g., weight percent) may have improved properties for 3D printing. For example, a composite comprising PP and a plurality of fibers (e.g., spray dried cellulose nanofibrils) with a weight percent of 10% may have a decreased crystallization rate compared to that of PP alone.

Non-isothermal crystallization may occur during 3D printing (e.g., FFF) under different conditions. Crystallization may occur at a high cooling rate (greater than 20° C./min), which primarily occurs when the printing nozzle is near the printed polymer. This form of crystallization may result in only a very small portion of the crystallized product. The dominant form of crystallization may occur at a lower cooling rate (in a range from about 5 to 10° C./min). The rate of crystallization may be evaluated according to a so-called crystallization half time ($t_{1/2}$). For example, iso-tactic PP (iPP) may crystalize more rapidly than poly(L-lactide) (PLLA). The $t_{1/2}$ of iPP (with a number-based molecular weight (Mn) of 4.18×104 g/mol at 120° C.) is about 2.93 min, and the $t_{1/2}$ of PLLA (Mn of 4.5×104 g/mol at 120° C.) is about 21.5 min. Accordingly, PLLA is more commonly used for 3D printing (e.g., FFF) using conventional approaches, because PLLA crystallizes slower than iPP under the same processing conditions.

At a temperature below a polymer's crystallization temperature (Tc), shrinkage of the polymer may be controlled by the thermal expansion of the amorphous portion of the polymer. When cooled from a melted state, PP is known to shrink more when it crystallizes above Tc than below Tc. Therefore, PP shrinkage is largely the result of the crystallization process.

In accordance with various embodiments, provided materials/compositions may exhibit a variety of melt-flow indices (MFI). For example, in some embodiments, provided materials/compositions may have a MFI of 50 g/10 min or lower (e.g., 40 g/10 min, 35 g/10 min, 30 g/10 min, 25 g/10 min, 20 g/10 min, 15 g/10 min, 10 g/10 min, 5 g/10 min, or lower). Without wishing to be held to a particular theory, it is contemplated that the use of relatively low MFI materials results in superior mechanical properties for an end-product.

Method of Making

In some embodiments, composites may be prepared using a "fast master-batch production process". For example, a polymer matrix and a plurality of fibers may be dried in an oven, for example, for at least an hour at a temperature above 90° C. (e.g., for 2 h at 105° C.). For example, the polymer matrix may have a composition that comprises one or more members selected from the group consisting of (i) a polymer blend comprising polypropylene (PP) and polyethylene (PE) [e.g., high density polyethylene (HDPE), low density polyethylene (LDPE), linear low-density polyethylene (LLDPE)], (ii) a modified (e.g., impact modified) polypropylene copolymer, and/or (iii) a polypropylene random copolymer. For example, the polymer matrix may have a composition of PP/PE of 70/30,75/25, 80/20, 85/15, or 90/10, by way of non-limiting example. In some embodiments, the plurality of fibers may be or comprise a plurality of natural cellulosic nanofibers (e.g., cellulose nanofibrils). For example, the fibers may have an average diameter of less than about 1000 nm (e.g., less than 900 nm, 800 nm, 700 nm, 600 nm, 500 nm, 400 nm, 300 nm, 200 nm, or 100 nm).

The dried components may then be compounded, for example, by mixing the polymer and the plurality of fibers by hand. In some embodiments, the fiber content may be at least 7.5 wt % (based on the total weight of the composite). In some embodiments, the fiber content may be at least 10 wt % (based on the total weight of the composite). In some embodiments, the fiber content may be at least 15 wt % (based on the total weight of the composite). In some embodiments, the fiber content may be at least 20 wt % (based on the total weight of the composite). In some embodiments, the fiber content may be at least 25 wt % (based on the total weight of the composite). In some embodiments, the fiber content may be at least 30 wt % (based on the total weight of the composite, e.g., 35 wt %, 40 wt %, 45 wt %, 50 wt % or more). In some embodiments the fiber content may be in a range from 3% to at least 30% (e.g., between 3 and 25%, 3 and 30%, 3 and 15%, 3 and 10%, 5 and 30%, 5 and 25%, 5 and 20%, 5 and 15%, 5 and 10%, etc).

The extruder may be operated at, for example, 200° C. across the heating sections. In some embodiments, an extruder temperature may be between 175° C. and 250° C.

(e.g., between 185° C. and 250° C., between 195° C. and 250° C., between 200° C. and 250° C., between 175° C. and 240° C., between 175° C. and 230° C., between 175° C. and 220° C., between 175° C. and 210° C., between 175° C. and 200° C.). In some embodiments, an extruder temperature may be at least 175° C. (e.g., 180° C., 185° C., 190° C., 195° C., 200° C., 205° C., 210° C. or greater). In some embodiments, an extruder temperature may be at most 250° C. (e.g., 240° C., 230° C., 220° C., 210° C., 200° C., 190° C. or lower). The extrusion speed may, for example, be set to about 250 rotations per minute (rpm). To obtain "master-batch" pellets, extrudates may be collected continuously, cooled, and grinded, for example, using a granulator. In some embodiments, the resulting "master-batch" pellets and a polymer, polymer blend, and/or copolymer may be dried, for example, in an oven. These dried components may then be mixed and compounded to prepare pellets with desired amounts of the plurality of fibers (e.g., 1 wt. %, 3 wt. %, 5 wt. %, 10 wt. %, 15 wt. %, 20 wt. %, 25 wt. %, 30 wt. %, or the like). Before being transferred to an injection molder (e.g., Model #50 "Minijector"), these pellets may be dried, for example, in an oven. In some embodiments, the injection molder might operate at an injection pressure of about 17 MPa at 200° C. It should be understood that other injection pressures may be used in certain embodiments, for example, at least 10 MPa at 200° C. (e.g., at least 11, 12, 13, 14, 15, 16, 17, 18, 19, or 20 MPa at 200° C.). In some embodiments, an injection pressure may be at most 30 MPa at 200° C. (e.g., at most 25, 20, 19, 18, 17, 16, 15, or 10 MPa at 200° C.).

In some embodiments, for composites comprising PP copolymers, pellets may be directly fed into a twin-screw extruder to make filaments for printing. In some embodiments, for composites comprising PP/PE blends, PP and PE pellets may be mixed together. For example, mixed pellets may be fed into a twin-screw extruder equipped with a round die. Filaments may then, for example, be stretched to a certain diameter, cooled, and collected on spools for printing. In some embodiments, the plurality of fibers may be added the polymer matrix in a dry form. The mixture may then, for example, be shear mixed and fed into an extruder to produce composite filaments that can be used for 3D printing.

In some embodiments, the composite comprises a polymer matrix with low MFI (e.g., in a range from 5 to 40 g/10 min, for example, from 5 to 30 g/10 min, from 5 to 20 g/10 min, from 5 to 10 g/10 min, from 10 to 40 g/10 min, from 20 to 40 g/10 min, from 30 to 40 g/10 min, from 10 to 30 g/10 min, from 5 to 30 g/10 min, from 5 to 20 g/10 min). This range of MFI may provide improved mechanical properties in parts printed using the composite. In some embodiments, the composite does not require inorganic fillers and, thus, may be low cost, light weight, and environmentally friendly. In some embodiments, the plurality of fibers may provide an improved stiffness to the printed product.

Printing with the Composite

In some embodiments, filaments of the composites may be printed without additional modification. In some embodiments, during printing, the plate may be maintained at a relatively high temperature to reduce crystallization and shrinkage of the composite.

While PP and PE (e.g., HDPE, LDPE, and/or LLDPE) are found ubiquitously in many products and industries, these semi-crystalline polyolefins are rarely used for additive manufacturing. Those skilled in the art will appreciate that other semi-crystalline polyolefins may also be utilized in the methods and compositions described herein. The ability to use these materials for additive manufacturing would lower the cost of this technology and allow it to be used to create a broader range of products.

EXPERIMENTAL EXAMPLES

Example 1: Preparing Example Composite Samples

In an example embodiment, iPP Homopolymer (H19G-01) was obtained from Ineos Olefins & Polymers USA (League City, TX). iPP Homopolymer (H19G-01) has a density of 0.91 g/cm$^3$, a melting point of 160° C., a melt flow index of 19 g/10 min (230° C./2.16 kg), a tensile strength (yield) of 37.2 MPa, a flexural modulus of 1.78 GPa, and a notched Izod impact Strength of 2.8 kJ/m$^2$. MAPP pellets (Polybond 3200) with a maleic anhydride content of about 1.0 wt. % were obtained from Chemtura Corporation (Lawrenceville, GA). MAPP pellets (Polybond 3200) have a density of 0.91 g/cm$^3$ and a MFI of 115 g/10 min (190° C./2.16 kg). A suspension of cellulose nanofibrils (CNF) (about 3 wt. %) was acquired from the Process Development Center of University of Maine. CNF powders were obtained by spray drying a 1.2 wt. % CNF suspension using a pilot-scale spray dryer (GEA-Niro, Germany). Drying was performed at an inlet temperature of 250° C., a disk spinning rate of 30,000 rpm, and a pump feeding rate of 0.4 L/min.

Table 1 shows examples of composites comprising isotactic polypropylene (iPP), maleic anhydride polypropylene (MAPP), cellulose nanofibrils (CNF), and/or maleic anhydride (MA).

TABLE 1

Formulations of iPP/CNF composites.

| Samples | Labels | iPP | CNF | MAPP |
| --- | --- | --- | --- | --- |
| iPP | iPP | 100 | 0 | 0 |
| iPP + MAPP | iPP/MA | 98 | 0 | 2 |
| iPP + 3% CNF | iPP/CNF3% | 97 | 3 | 0 |
| iPP + MAPP + 3% CNF | iPP/MA/CNF3% | 95 | 3 | 2 |
| iPP + 10% CNF | iPP/CNF10% | 90 | 10 | 0 |
| iPP + MAPP + 10% CNF | iPP/MA/CNF10% | 88 | 10 | 2 |
| iPP + 30% CNF | iPP/CNF30% | 70 | 30 | 0 |
| iPP + MAPP + 30% CNF | iPP/MA/CNF30% | 68 | 30 | 2 |

Example 2: Non-Isothermal Crystallization Studies

Non-isothermal crystallization studies were performed using a TA Instruments Q 2000 calorimeter (New Castle, Delaware, USA). About 1 mg to 2 mg of each sample was cut from the corresponding pellet and sealed in a T$_{zero}$ aluminum pan. Samples were first heated to 190° C. at a heating rate of 50° C./min and held at 190° C. for 5 minutes to minimize thermal history. Samples were then cooled to 50° C., at four cooling rates (5, 10, 15, and 20° C./min). The cooling rate was selected based on the equipment's cooling capacity and the temperature of the test. The most rapid cooling rate of 20° C./min was used for a temperature of 50° C. for differential scanning calorimetry (DSC). Cooling rates in excess of 20° C./min could not be maintained by the equipment used in these example studies. Samples were then reheated from 50° C. to 190° C. at a rate of 10° C./min to obtain melting information. All measurements were performed under a nitrogen atmosphere with a flow rate of 50 mL/min.

The crystallinity ($X_C$) of iPP in the composites was calculated based on:

$$X_c = \Delta H_m / (\Delta H_f^o \times \Phi)$$

where $\Delta H_m$ is the melting enthalpy of iPP, $\Delta H_f^o$ is the fusion enthalpies of iPP with a 100% crystallinity and was set to 209 J/g. $\Phi$ is the percentage of polymer in the composites. Different samples were used for different cooling rates.

The crystallization kinetics of iPP and its composites are displayed in Table 2. As a basic trend, the onset temperature ($T_o$), crystallization peak temperature ($T_p$) and crystallinity of iPP ($X_c$) of all samples decrease as the cooling rate increases. At a slower cooling rate, more crystal nuclei formed during the same interval of time. Therefore, crystallization was more complete under slow cooling than fast cooling. The composite had the highest $X_C$ at 30 wt. % CNF, indicating that CNF acted as a weak nucleation agent for iPP at a low weight percent. The extent to which the CNF acted as a nucleation agent in the iPP matrix may have depended on factors like fiber size, chemical composition, surface polarity, and surface topography. Coarse fibers may have been more effective as a heterogeneous nucleation agent. CNF was likely present mostly as spherical particles with smooth surfaces, explaining why CNF was a weak nucleation agent and was a suitable filler for iPP to be used for FFF.

TABLE 2

Non-isothermal crystallization parameters at various cooling rates.

| Samples | $\lambda^a$ (K/min) | $T_o^b$ (°C.) | $T_p^c$ (°C.) | $X_c^d$ (%) | $t_{1/2}^e$ (min) |
|---|---|---|---|---|---|
| iPP | 5 | 134.8 | 126.1 | 49.0 | 1.75 |
|  | 10 | 131.2 | 122.7 | 49.6 | 0.88 |
|  | 15 | 129.2 | 120.8 | 48.4 | 0.59 |
|  | 20 | 127.2 | 119.0 | 46.1 | 0.46 |
| iPP/CNF3% | 5 | 134.0 | 125.9 | 50.0 | 1.59 |
|  | 10 | 131.8 | 122.6 | 48.4 | 0.85 |
|  | 15 | 129.7 | 120.9 | 45.9 | 0.60 |
|  | 20 | 127.5 | 118.7 | 47.8 | 0.47 |
| iPP/CNF10% | 5 | 135.2 | 125.8 | 51.6 | 1.85 |
|  | 10 | 131.8 | 122.6 | 48.2 | 0.95 |
|  | 15 | 130.4 | 120.7 | 49.3 | 0.66 |
|  | 20 | 128.9 | 119.5 | 49.1 | 0.49 |
| iPP/CNF30% | 5 | 134.3 | 126.2 | 56.4 | 1.56 |
|  | 10 | 132.3 | 123.2 | 54 | 0.88 |
|  | 15 | 130.3 | 121.3 | 57.6 | 0.58 |
|  | 20 | 128.7 | 120.2 | 47.7 | 0.42 |
| iPP/MA | 5 | 133.4 | 125.8 | 53.4 | 1.51 |
|  | 10 | 130.9 | 122.8 | 51.9 | 0.81 |
|  | 15 | 129.4 | 121.0 | 49.3 | 0.56 |
|  | 20 | 127.2 | 119.3 | 47.1 | 0.41 |
| iPP/MA/CNF10% | 5 | 133.0 | 125.3 | 52.1 | 1.51 |
|  | 10 | 130.8 | 122.4 | 50.1 | 0.83 |
|  | 15 | 128.6 | 120.3 | 49.2 | 0.55 |
|  | 20 | 127.1 | 118.3 | 49.3 | 0.46 |

$^a\lambda$-cooling rate, $^bT_o$-onset temperature, $^cT_p$-peak temperature, $X_c^d$-crystallinity and $t_{1/2}^e$-half crystallization time.

During non-isothermal crystallization, the relative degree of crystallinity ($X_t$) is a function of crystallization temperature that can be calculated from the following equation:

$$X_t = \int_{T_0}^{T} \left(\frac{dH_c}{dT}\right) dT \Big/ \int_{T_0}^{T_\infty} \left(\frac{dH_c}{dT}\right) dT$$

where $T_o$ is the onset temperature, T is the temperature at time t, $T_\infty$ is the temperature at the completion of crystallization, and $dH_c$ is the enthalpy of crystallization. The value of $X_t$ can also be associated with the crystallization time via the relationship between T to t:

$$t = (T_0 - T)/\lambda$$

where $\lambda$ is the cooling rate.

In Table 2, $t_{1/2}$ refers to the time when 50% $X_t$ was achieved. As the cooling rate was increased, $t_{1/2}$ decreased. The driving force for this trend was likely the dependence of nucleation and crystal growth rate on the degree of undercooling [16,24]. In other words, higher undercooling resulted in faster polymer nucleation and growth. With 3 wt. % CNF, the $t_{1/2}$ of iPP was decreased by 9% when $\lambda$=5 K/min. At 30 wt. % CNF, the $t_{1/2}$ of iPP was reduced by 11% when $\lambda$=5 K/min. At these low loading levels, CNF accelerated the crystallization rate of iPP. However, at 10 wt. % CNF, the $t_{1/2}$ of iPP was decreased by 6%, indicating CNF slowed the crystallization of iPP.

Based on this analysis, CNF at 10 wt. % can be used as an additive in iPP during FFF to help limit shrinkage during printing. Adding MAPP to the iPP/CNF composite increased the crystallization rate of iPP by 14% when $\lambda$=5 K/min. First, MAPP alone is reported to be a nucleating agent for iPP that helps to form more spherulitic sites and smaller spherulites [5]. This was confirmed by the shorter $t_{1/2}$ of iPP/MA composites in Table 2. The iPP/MA/CNF10 wt. % composite had a slightly higher crystallinity than the iPP/CNF10 wt. % composite. A higher degree of undercooling was directly associated with faster crystallization. Lastly, MAPP improved the compatibility between CNF and iPP, allowing CNF to become more evenly distributed in the iPP and enhancing the nucleation agent characteristics of CNF. Therefore, MAPP was not necessarily an appealing additive for FFF processing of iPP.

The overall crystallization rate of iPP depended on the nucleation rate and crystal growth rate. The addition of CNF at various loading levels affected the nucleation rate and crystal growth rate in different ways, yielding the results presented above.

To help understand how the crystallization kinetics behaved nonisothermal crystallization kinetic models were applied to fit the experimental data.

Nonisothermal Crystallization Kinetics Modeling
Jeziorny Method

Both isothermal and nonisothermal crystallization processes can be described by the Avrami's model. The relation between relative degree of crystallinity ($X_t$) and elapsed crystallization time (t) is:

$$1 - X_t = \exp(-Kt^n)$$

where K is the kinetic constant related to nucleation and crystal growth and n is the Avrami exponent that is determined by the geometry of the nucleated and grew crystals. A higher value of K corresponds to a faster crystallization rate. The equation above is commonly expressed in its double logarithmic form:

$$\ln[-\ln(1-X_t)] = n \ln t + \ln K$$

FIG. 1 shows a plot of $\ln[-\ln(1-X_t)]$ vs. $\ln(t)$ in $X_t$ range from about 0.01% to 63%. These plots yield an approximately straight line. At higher values of $X_t$, the curves in FIG. 1 are less linear, possibly because secondary crystallization and impingement of crystals dominated the crystallization process, suggesting that the Avrami's method is not applicable in this regime. The slope of the lines in FIG. 1 is n, and the y intercept with is ln(K). Because the crystallization temperature changes during nonisothermal crystallization, n and K are used as curve-fitting parameters for this data and do not necessarily have a physical meaning.

The Avrami's model was modified by Jeziorny to describe nonisothermal crystallization kinetics. The K parameter was corrected to account for the effect of cooling rate during testing. The modified crystallization rate constant $K_J$ is given by:

$$\ln K_J = (\ln K)/\lambda$$

Data from fitting the curves obtained from Jeziorny method are shown in Table 3. Generally, n decreased and $K_J$ increased as the cooling rate increased. For iPP, n varied from 4.57 to 5.33, indicative of tridimensional, homogeneous crystal growth. After CNF was added, n decreased, because CNF may have acted as a nucleating agent, changing the nucleation type from homogeneous to heterogeneous. iPP/CNF3%, iPP/CNF30%, and iPP/MA/CNF10% had a larger $K_J$ than iPP at a slower cooling rate. At faster cooling rates, $K_J$ did not increase significantly, possibly because undercooling altered the nucleation density and became the dominant driving force of crystallization. The iPP/CNF10% composite had a smaller $K_J$ than iPP, which was consistent with the results shown in Table 2. Therefore, the Jeziorny method effectively described the nonisothermal crystallization kinetics of iPP/CNF composites.

TABLE 3

Crystallization parameters calculated from Jeziorny method.

| Samples | $\lambda^a$ | n | $K_J$ | $R^2$ |
|---|---|---|---|---|
| iPP | 5 | 5.33 | 0.49 | 0.991 |
|  | 10 | 4.89 | 0.99 | 0.998 |
|  | 15 | 4.60 | 1.11 | 0.999 |
|  | 20 | 4.57 | 1.13 | 0.997 |
| iPP/CNF3% | 5 | 4.33 | 0.58 | 0.983 |
|  | 10 | 5.07 | 1.02 | 0.999 |
|  | 15 | 4.30 | 1.10 | 0.998 |
|  | 20 | 3.66 | 1.10 | 0.995 |
| iPP/CNF10% | 5 | 5.19 | 0.48 | 0.997 |
|  | 10 | 3.98 | 0.98 | 0.999 |
|  | 15 | 4.23 | 1.08 | 0.999 |
|  | 20 | 3.65 | 1.10 | 0.997 |
| iPP/CNF30% | 5 | 4.26 | 0.62 | 0.995 |
|  | 10 | 4.41 | 1.00 | 0.999 |
|  | 15 | 3.75 | 1.09 | 0.999 |
|  | 20 | 3.16 | 1.11 | 0.997 |
| iPP/MA/CNF10% | 5 | 4.23 | 0.61 | 0.984 |
|  | 10 | 4.69 | 1.03 | 0.999 |
|  | 15 | 3.98 | 1.11 | 0.998 |
|  | 20 | 3.90 | 1.12 | 0.999 |

$^a\lambda$-cooling rate.

Ozawa Method

The Ozawa method models the nonisothermal crystallization process as a sum of many isothermal crystallization processes occurring at an infinitesimal time over the crystallization period. This mathematical model is also based on the Avrami equation:

$$1 - X_t = \exp[-K(T)/\lambda^m]$$

where K(T) is the crystallization constant and depends on the crystallization temperature, and m is the Ozawa exponent. A double logarithmic form can also be obtained from above equation:

$$\ln[-\ln(1-X_t)] = \ln K(T) - \min(\lambda)$$

Figure 2:
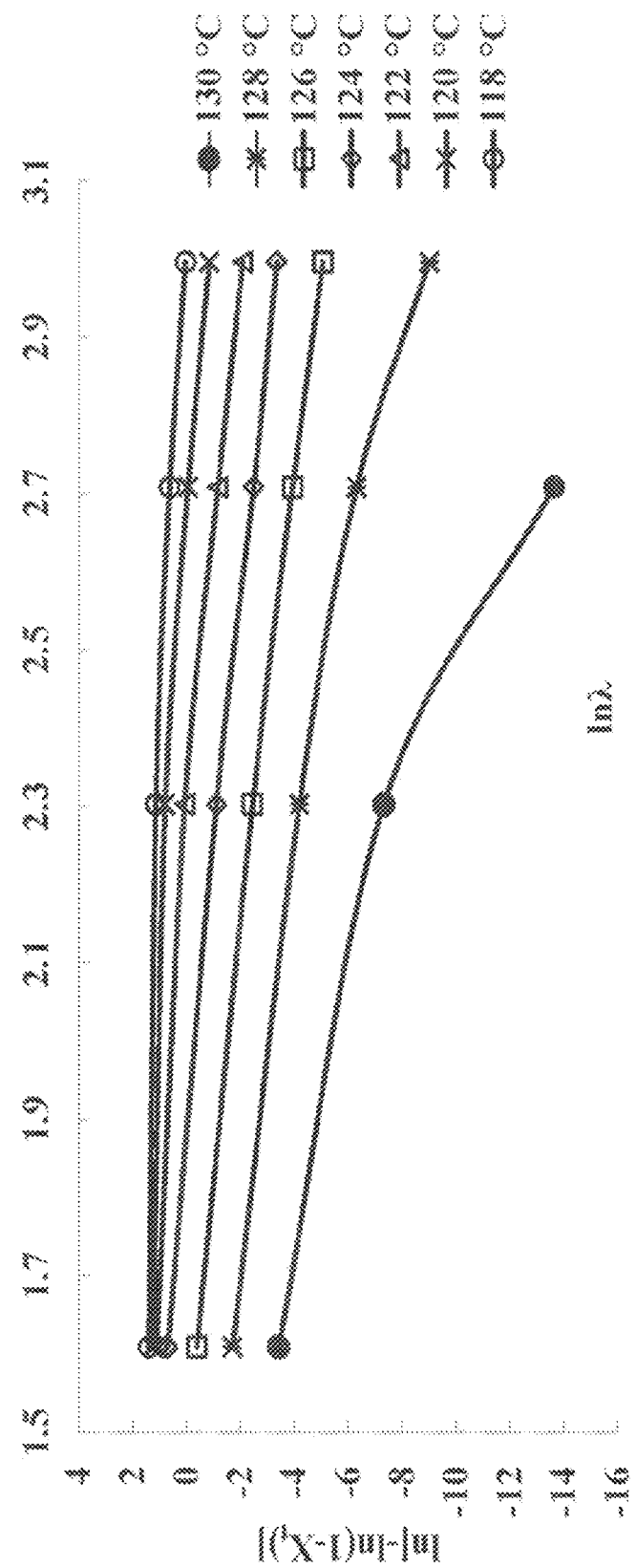
FIG. 2 shows plots of $\ln[-\ln(1-X_t)]$ as a function of $\ln(\lambda)$ for iPP/CNF10% composites based on Ozawa method, according to an illustrative example.

FIG. 2 shows a plot of in $[-\ln(1-X_t)]$ versus $\ln \lambda$ at different crystallization temperatures. K(T) and m were obtained from the intersections and slopes of the lines shown in FIG. 2. As shown in FIG. 2, the curves were relatively linear at lower crystallization temperatures. At high crystallization temperatures, the curves were less linear. The Ozawa method does not account for secondary crystallization which can occur at the early stages of crystallization. Therefore, the Ozawa method was not effective for describing the nonisothermal crystallization of the iPP/CNF composites.

Liu Method

Figure 3:
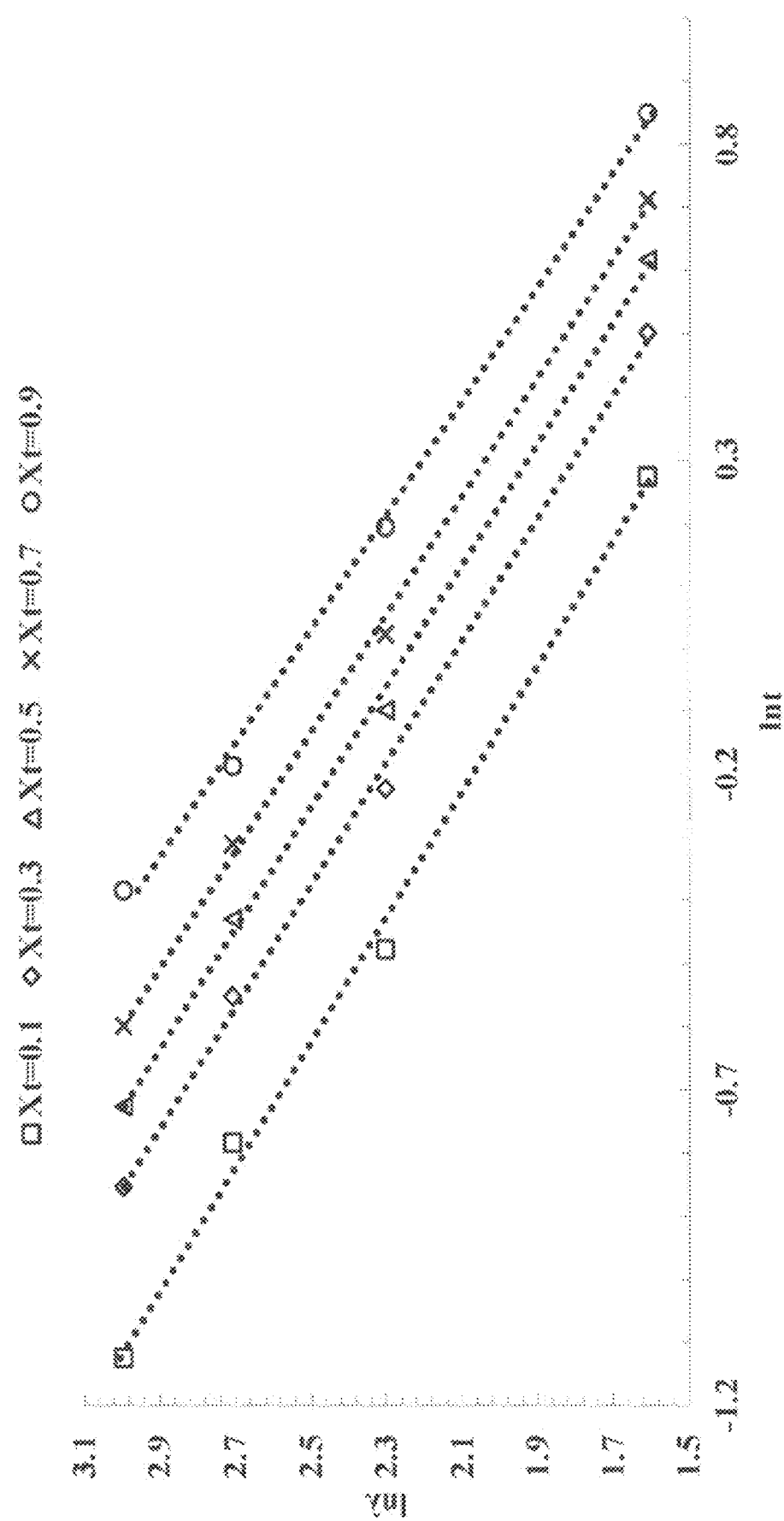
FIG. 3 shows plots of $\ln(\lambda)$ as a function of $\ln(t)$ at different $X_t$ values for iPP/CNF10% composites based on the Liu method, according to an illustrative example.

Liu et al. proposed a method to exactly describe nonisothermal crystallization kinetics by combining Avrami and Ozawa methods [30]. The equation is $$\ln \lambda = \ln F(T) - \alpha \ln t,$$

$$F(T) = [K(T)/K]^{1/m},$$

$$\alpha = n/m,$$

where F(T) is the cooling rate required during unit crystallization time for a polymer with a certain degree of crystallinity. A smaller value F(T) may correspond to a faster crystallization rate. K is the Avrami constant, n is the Avrami exponent, K(T) is the Ozawa constant, m is the Ozawa exponent, and $\lambda$ is the cooling rate. FIG. 3 shows a plot of ln $\lambda$ versus ln t. Values of a and in F(T) were obtained from the slopes and intercepts of these curves.

Kinetic parameters from the Liu method are shown in Table 4. The α values of iPP and iPP/CNF were near 1, indicating that the Jeziorny and Ozawa methods are similar effective for modeling the nucleation mechanism and crystal geometry, especially at low $X_t$. F(T) increased monotonically with an increase in $X_t$, indicating that crystallization became more difficult at higher $X_t$. The iPP/CNF3%, iPP/CNF30% and iPP/MA/CNF10% composites exhibited slightly decreased F(T) values for iPP compared to those at the same $X_t$, indicating that CNF at these loading levels accelerated the crystallization of iPP. The iPP/CNF10% composite had the opposite effect on the F(T) of iPP and decreased the rate of iPP crystallization. These findings are consistent with the $t_{1/2}$ values shown in Table 2.

TABLE 4

Crystallization parameters calculated from Liu method.

| Sample | $X_t^a$ (%) | α | F(T) | $R^2$ |
|---|---|---|---|---|
| iPP | 10 | 0.95 | 6.50 | 0.999 |
|  | 30 | 1.00 | 7.86 | 0.999 |
|  | 50 | 1.03 | 8.85 | 0.999 |
|  | 70 | 1.07 | 9.95 | 0.999 |
|  | 90 | 1.16 | 12.38 | 0.998 |
| iPP/CN F3% | 10 | 1.10 | 5.80 | 0.999 |
|  | 30 | 1.11 | 7.47 | 0.999 |
|  | 50 | 1.14 | 8.46 | 1.000 |
|  | 70 | 1.20 | 9.65 | 0.999 |
|  | 90 | 1.29 | 11.97 | 0.994 |
| iPP/CNF10% | 10 | 1.01 | 6.51 | 0.996 |
|  | 30 | 1.03 | 8.28 | 0.998 |
|  | 50 | 1.04 | 9.38 | 0.998 |
|  | 70 | 1.07 | 10.57 | 0.999 |
|  | 90 | 1.11 | 12.62 | 0.997 |
| iPP/CNF30% | 10 | 1.00 | 5.52 | 0.988 |
|  | 30 | 1.05 | 7.22 | 0.995 |
|  | 50 | 1.07 | 8.33 | 0.995 |
|  | 70 | 1.10 | 9.45 | 0.997 |
|  | 90 | 1.14 | 11.53 | 0.997 |

TABLE 4-continued

Crystallization parameters calculated from Liu method.

| Sample | $X_t^a$ (%) | α | F(T) | $R^2$ |
|---|---|---|---|---|
| iPP/MA/CNF10% | 10 | 1.08 | 5.45 | 0.996 |
| | 30 | 1.12 | 7.00 | 0.999 |
| | 50 | 1.15 | 8.05 | 0.996 |
| | 70 | 1.18 | 9.13 | 0.993 |
| | 90 | 1.27 | 11.35 | 0.994 |

$^a X_t$-relative degree of crystallinity

Effective Activation Energy

Figure 4:
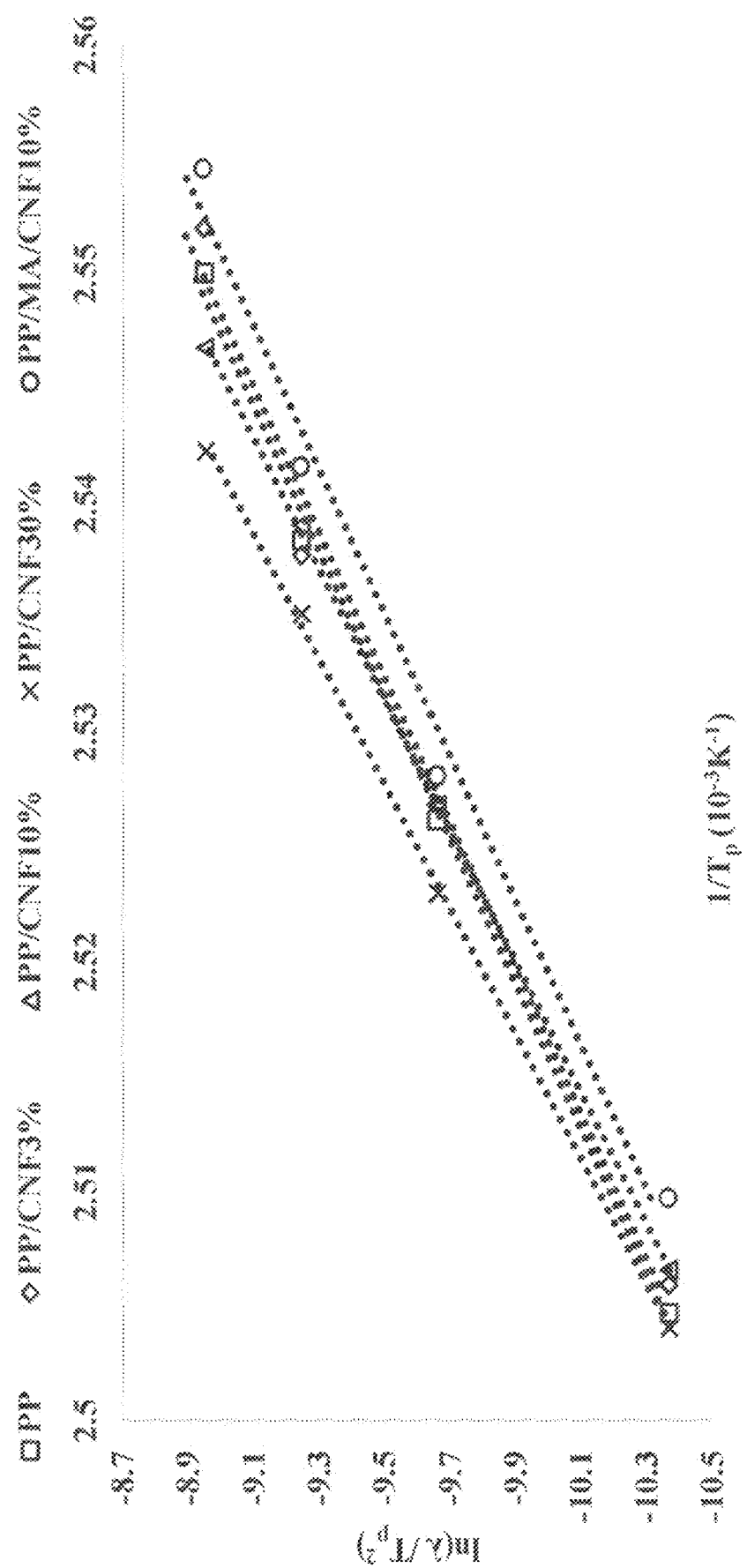
FIG. 4 shows plot of $\ln(\lambda/T_p^2)$ against $1/T_p$ used to calculate values of $\Delta E$ based on Kissinger method, according to an illustrative example.

The effective activation energy (ΔE) during polymer crystallization provides a measure of the energy required to transport macromolecular segments to the surface of a crystal. The Kissinger equation was used to calculate ΔE from the crystallization peak temperature ($T_p$) and cooling rate (λ). The Kissinger method equation is:

$$d[\ln(\lambda/T_p^2)] = -\frac{\Delta E}{R}d(1/T_p),$$

where λ is the cooling rate, $T_p$ is the peak crystallization temperature, and R is the universal gas constant (8.314 J/(Kmol)). FIG. 4 shows a plot of ln $(\lambda/T_p^2)$ versus $1/T_p$. The plots in FIG. 4 are relatively linear. Values of ΔE were obtained from the slopes of these lines. The calculated activation energies of the different samples are shown in Table 5. The value of ΔE for the iPP/CNF3% composite was similar to that of iPP. However, the ΔE values of the iPP/CNF10% and iPP/CNF30% composites were increased compared to that of iPP. CNF at 30 wt. % appeared to reduce the rate of iPP crystallization. Moreover, adding MAPP to the iPP/CNF10% composite reduced the value of ΔE.

TABLE 5

Effective activation energy calculated based on the Kissinger method.

| Samples | iPP | iPP/CNF3% | iPP/CNF10% | iPP/CNF30% | iPP/MA/CNF10% |
|---|---|---|---|---|---|
| ΔE (kJ/mol) | 264.1 | 262.5 | 291.6 | 305.5 | 265.2 |
| $R^2$ | 0.997 | 0.989 | 0.999 | 0.999 | 0.988 |

Example 3: Microscopy

To evaluate the crystal morphology of the example iPP/CNF composites, a ME520 Series polarized light microscope (PLM) (AmScope, USA) was utilized. Sections that were 3 μm-thick were obtained from cross sections of injection molded specimens using a Sorvall MT2-B Ultramicrotome. Each section was placed between a glass slide and a cover slip then transferred to a hot plate (Thermo Scientific) at 200° C. for 2 min before it was cooled at room temperature.

Figure 5:
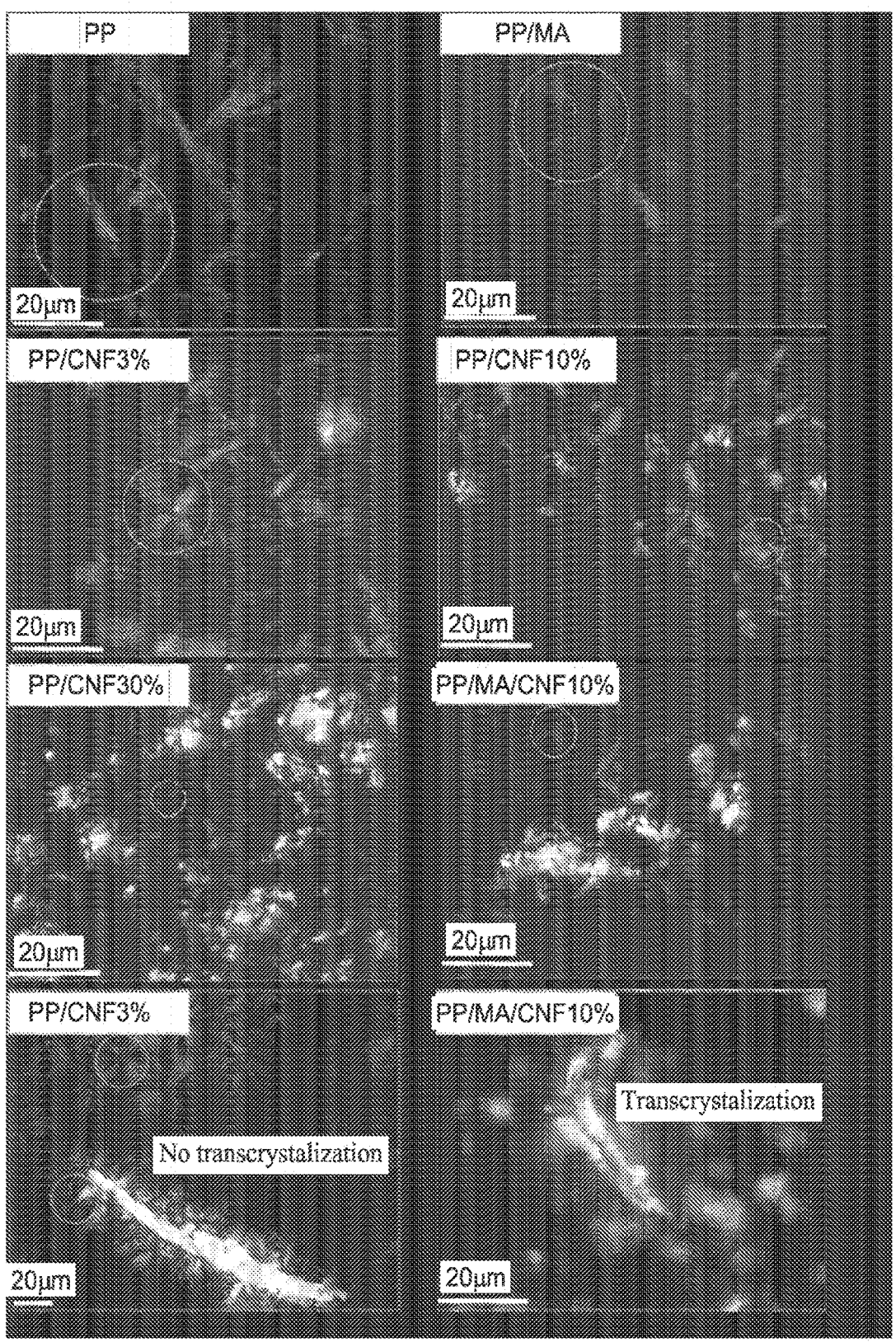
FIG. 5 shows polarized light micrographs (PLMs) of iPP and iPP/CNF composites. Circles depict the Maltese-cross patterns of iPP spherulites. The lower left and right plots show the effect of MAPP on transcrystallization.

FIG. 5 shows the crystal morphology of iPP and iPP/CNF composites obtained by a polarized light microscope. Because no cold-crystallization peaks were observed in the DSC scans for all specimens, the crystal morphology caused by the micrograph preparation was negligible. As the CNF content was increased in the iPP matrix, the nucleation density increased, but spherulite size decreased. Typical crystal diameters of iPP, iPP/MA, and the iPP/CNF3%, iPP/CNF10%, iPP/CNF30% and iPP/MA/CNF10% composites were about 33 μm, 27 μm, 21 μm, 12 μm, 8 μm, and 10 μm, respectively. These results suggested that CNF restricted the folding motion of polymer chains during crystallization and made the re-entry of polymer chains into the crystal face more difficult, resulting in smaller crystals. Hence, steric hindrance attributed to a large concentration of CNF resulted in the high values of ΔE for iPP, as shown in Table 5. Meanwhile, MAPP allowed the PP to mix more effectively with CNF. MAPP may also have facilitated transcrystallization, a process in which spherulites grow perpendicularly to a surface. Transcrystallization can improve the attachment of polymer segments to the crystal surface and reduce ΔE. However, the method used in this example to prepare sections for PLM observation involved fairly rapid cooling (~80° C./min), which may have created thin transcrystalline layers. Thin crystal layers are not readily seen in PLM at high magnification because of their weak light intensity. A possible site of CNF transcrystallization was identified in the iPP/MA/CNF10% composite shown in FIG. 5. As a comparison, the morphology of the PP spherulites on the CNF surfaces in the PP/CNF3% composite is also shown and was almost identical to that of the iPP matrix. These results suggest that MAPP caused a transcrystalline layer formation. The PLM micrographs also confirmed kinetic results obtain in previous sections.

The overall crystallization rate may be dependent on nucleation rate and crystal growth rate. For iPP/CNF3%, the presence of CNF increased the nucleation density without affecting the crystal growth. Therefore, iPP/CNF3% had an accelerated crystallization rate. For iPP/CNF10%, the nucleation density pf iPP was increased by the CNF. At the same time, crystal growth was impeded by CNF. Overall, CNF reduced iPP's crystallization rate when present at 10 wt. %. After MAPP was introduced to iPP/CNF10%, the nucleation density of the composite furthered increased because of a coupling effect. Moreover, the formation of transcrystalline layers facilitated crystal growth.

Example 4: Thermal Expansion Tests

Thermal expansion measurements were conducted on injection-molded specimens along the flow direction according to the ASTM D 696-16. Because iPP has a glass transition temperature near 0° C., thermal expansion measurements were performed separately in a temperature range from −30° C. to 30° C. The thermal expansion above $T_g$ of iPP was larger than that below $T_g$. For this study, thermal expansion above $T_g$ was considered to be of more interest. The equation used to calculate the coefficient of thermal expansion was:

$$\alpha = \Delta L/L_0\Delta T$$

where ΔL was the change in length of specimen caused by temperature change, $L_0$ was the length of specimen at room temperature, and ΔT was the change in temperature (30° C.). Three replicates were measured for condition.

Based on the results from the nonisothermal crystallization kinetics studies, the composite comprising 10 wt. % CNF was selected for use in FFF. The effect of CNF on the thermal expansion of iPP was investigated, and the results are shown in Table 6. The coefficient of thermal expansion (CTE) of iPP was within the CTE range of iPP. After adding 10 wt. % CNF to iPP, the CTE decreased by 11.7%. Because cellulose possesses a small CTE and the addition of CNF replaces a portion of iPP, the composite displayed a lower CTE than that of iPP. This lower CTE was expected to reduce iPP shrinkage caused by temperature changes below the crystallization temperature during FFF.

TABLE 6

Coefficient of thermal expansion of iPP and iPP/CNF composites.

| Samples | $\alpha^a$ ($10^{-6}/°$ C.) | Significance |
|---|---|---|
| iPP | 80.1 (3.1)$^b$ | A$^c$ |
| iPP/CNF10% | 70.7 (2.4) | B |

$^a$coefficient of thermal expansion, $^b$standard deviation and $^c$capital letters represent statistical differences. Values with different letters are significantly different at 95% confidence level.

What is claimed is:

1. A composite, the composite comprising:
   a polymer matrix comprising polypropylene (PP) and polyethylene (PE); and
   a plurality of cellulosic nanofibers, wherein the composite does not comprise maleic anhydride (MA), wherein the weight percent of the plurality of cellulosic nanofibers is in a range from 3% to 30%, based on the total weight of the composite.

2. The composite of claim 1, wherein the melt flow index (MFI) of the polymer matrix is in a range from about 5 to 30 g/10 min, measured at 230° C./2.16 kg.

3. A pellet comprising the composite of claim 1.

4. A filament comprising the composite of claim 1.

5. A method of 3D printing, comprising 3D printing with the filament of claim 4.

6. The method of claim 5, wherein the temperature of the substrate is at least 35° C.

7. The method of claim 6, wherein the substrate is a plate on which printing is performed.

8. The method of claim 6, wherein the temperature of the substrate is maintained at a relatively high temperature to reduce crystallization and shrinkage of the composite.

9. The composite of claim 1, wherein the composite is used in additive manufacturing or fused layer modeling.

10. The composite of claim 1, wherein the polyethylene (PE) is selected from high density polyethylene (HDPE), low density polyethylene (LDPE), or linear low-density polyethylene (LLDPE).

11. The composite of claim 1, wherein the plurality of cellulosic nanofibers are or comprise natural cellulose nanofibers.

12. The composite of claim 1, wherein the plurality of cellulosic nanofibers have an average diameter of less than 1000 nm.

* * * * *